United States Patent [19]

Milewski

[11] 4,094,463
[45] June 13, 1978

[54] SYSTEM HAVING RESET ACTION

[75] Inventor: Sylvester Milewski, Morton Grove, Ill.

[73] Assignee: Honeywell Inc., Minneapolis, Minn.

[21] Appl. No.: 780,636

[22] Filed: Mar. 23, 1977

[51] Int. Cl.² .................... H01M 4/86; G05B 11/50
[52] U.S. Cl. ................................ 236/82; 137/86; 236/87
[58] Field of Search ............... 318/609; 236/82, 87; 137/86

[56] References Cited

U.S. PATENT DOCUMENTS

| | | | |
|---|---|---|---|
| 2,285,540 | 6/1942 | Stein et al. | 236/82 |
| 2,481,395 | 9/1949 | Carns | 236/86 |
| 2,612,902 | 10/1952 | Ward | 137/82 |
| 3,059,854 | 10/1962 | Fehlinger | 137/86 X |

*Primary Examiner*—William E. Wayner
*Attorney, Agent, or Firm*—Trevor B. Joike

[57] ABSTRACT

A system is disclosed for providing reset action in a controller, having an averaging circuit for supplying a pilot signal which is the average of an input signal and a feedback signal, a relay having an input connected to receive the pilot signal for providing an output signal which bears a predetermined relationship with the pilot signal, the output signal being connected in a feedback circuit to supply the feedback signal to the averaging circuit, and a capacity which is either connected to the feedback circuit to delay only the feedback signal or connected between the averaging circuit and the relay to delay both the output signal and the feedback signal. The input signal may be a controller output such as a control variable and the output signal may be used to control a control element such as a condition affecting the control variable.

20 Claims, 5 Drawing Figures

| SIG. IN | RESET SIG. | PILOT SIG. | SIG. OUT | COMMENT |
|---|---|---|---|---|
| 8 | 8 | 8 | 8 | STEADY STATE |
| 6 | 8 | ↓7 | ↓6 | INPUT CHANGE |
| 6 | ↓6 | ↓6 | ↓4 | DYNAMIC CONDITIONS |
| 6 | ↓4 | ↓5 | ↓2 | |
| 6 | ↓2 | ↓4 | ↓0 | |
| 6 | ↓0 | ↓3 | 0 | END RESULT |
| 8 | 0 | ↑4 | 0 | INPUT CHANGE |
| 8 | 0 | 4 | 0 | STEADY STATE |
| 10 | 0 | ↑5 | ↑2 | INPUT CHANGE |
| 10 | ↑2 | ↑6 | ↑4 | DYNAMIC CONDITIONS |
| 10 | ↑4 | ↑7 | ↑6 | |
| 10 | ↑6 | ↑8 | ↑8 | |
| 10 | ↑8 | ↑9 | ↑10 | |
| 10 | ↑10 | ↑10 | ↑12 | |
| 8 | 12 | 10 | 12 | INPUT CHANGE (STEADY STATE) |

SYSTEM HAVING RESET ACTION

BACKGROUND OF THE INVENTION

This invention relates to a system for providing reset action in a controller and, more particularly, the use of an averaging circuit to provide a simple means to produce reset action.

Automatic proportional control is used in many processes, for example temperature control within an oven. Typically, a temperature sensor within the oven produces an output signal, dependent upon the temperature within the oven, which is compared by a comparator to a signal indicative of the desired temperature within the oven, i.e., the setpoint. The output from the comparator is proportional to any deviation between the actual temperature and the desired temperature. This output is typically amplified and used to control either a valve which in turn controls the amount of gas flowing to a burner located within the oven or to a power amplifier for controlling the amount of current supplied to an electric heater within the oven. If a valve is the final control element, for example, the amplifier may be designed to supply an 8 volt output when the actual temperature equals the desired temperature. The valve, at 8 volts, is maintained at its mid-position. Any deviation of the actual temperature away from setpoint results in a change in the output voltage of the amplifier to move the valve away from its midposition. Alternatively, the amplifier may be designed to have 0 output voltage when the actual temperature equals the desired temperature. The valve may be designed to operate at its mid-position with a 0 volt input.

Thus, any change of the actual temperature away from set point again results in a change in the output voltage of the amplifier to move the valve away from its mid-position.

If a load change should occur, such as for example from a change in conditions either external or internal of the oven, the temperature within the oven will begin to change. The output from the comparator and the amplifier will change in proportion to the change in temperature within the oven and the valve is proportionally repositioned. However, since the oven now requires more heat (or less if the deviation from set point is in the other direction) than when the system is in balance, i.e., when the actual temperature equals the set point temperature, the comparator and amplifier must deviate from their mid-point output in order to maintain the valve at a position to insure that more heat (or less) is supplied to the oven.

In order to maintain this valve at its new position to meet the new conditions, the output from the amplifier must be such as to hold the valve at this new, non-middle position. Thus, the amplifier output must be a value other than that which it had when the actual temperature equaled the desired temperature and this value can only result when the actual temperature is not equal to the desired temperature. This difference between the actual temperature and the desired temperature which is necessary to maintain the valve at its new position is called "offset" or "droop."

This action means, of course, that the temperature within the oven will be maintained, not at the desired temperature, but at the "offset" temperature. When the system is under manual control, the operator will notice a departure of the temperature within the oven from the desired temperature within the oven and will readjust the valve or power amplifier accordingly. However, when the system is in automatic control, a proportional control system is insufficient of itself to compensate for this "offset."

To overcome this deficiency in automatic control systems, the prior art turned to reset. Reset simply forces the process back to the setpoint by shifting the proportional band up or down the scale of a controller until the required valve opening or power amplifier energization returns the variable, i.e. the temperature, to the control or set point. In effect, therefore, reset action produces a continuing change in the output until the control variable is again equal to the desired set point. The present invention relates to a means for providing this reset action.

SUMMARY OF THE INVENTION

In the present invention, a two-signal averaging circuit has a first input which is connected to receive the control signal, and a second input for receiving a feedback signal, a relay has an input connected to the output of the averaging circuit and an output for producing an output signal bearing a predetermined relationship to its input, a feedback circuit is connected from the output of the relay to the second input of the averaging circuit, and a capacity or delay circuit is connected either in the feedback circuit or in the circuit connecting the output of the averaging circuit to the input of the relay. Under this mechanism, any change in the input signal from the balance point selected will result in a continually changing output until the input signal has been re-established at its steady state condition, i.e., the control variable has been brought back to its set point.

BRIEF DESCRIPTION OF THE DRAWINGS

These and other features and advantages will become apparent from a detailed review of the invention taken in conjunction with the drawings in which.

DETAILED DESCRIPTION OF THE INVENTION

Figures 1, 5:
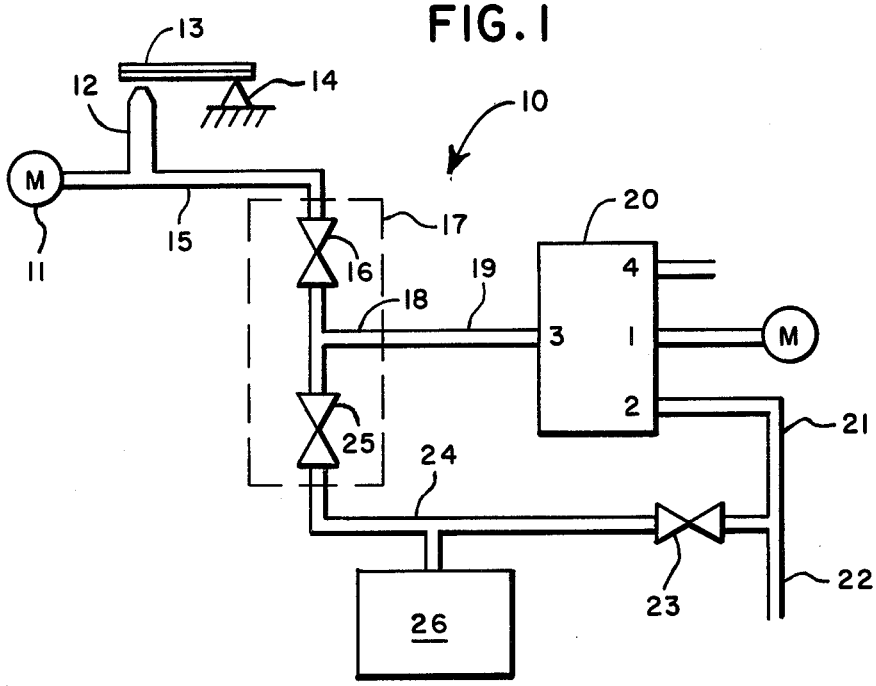
FIG. 1 shows one form of an arrangement for providing reset action.

In FIG. 1, a source of main pressure 11, for reset controller 10, is connected to nozzle 12 operating in conjunction with a bimetallic, temperature sensitive flapper 13. Flapper 13 is pivoted about fixed pivot point 14 and its proximity to nozzle 12 controls the pressure within line 15. Flapper 13 may have a set point mechanism (not shown) associated with it so that the signal in line 15 is representative of both the actual temperature and the set point temperature. Line 15 connects nozzle 12 to first restriction 16 within pressure dividing circuit 17. Output 18 of circuit 17 is connected by line 19 to the input of relay 20 which may be the Pneumatic Ratio Relay RP971A manufactured by Honeywell Inc. Terminal 4 of relay 20 is connected to atmosphere, terminal 1 is connected to main pressure and terminal 2 is connected to output line 21. Output line 21 provides an output pressure at 22 and also feeds the output pressure back through restriction 23 by line 24 to second restriction 25 within circuit 17. A capacity tank 26 is connected to the line 24. In the preferred embodiment, circuit 17 is an averaging circuit such that restrictions 16 and 25 are substantially equal in size to provide the averaging function.

Figure 4:
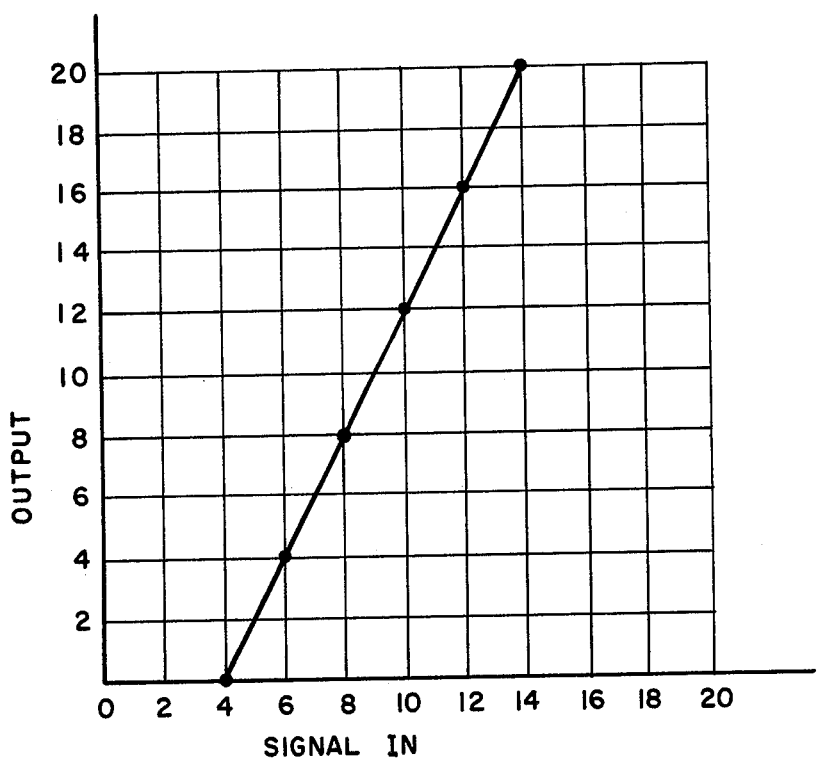
FIG. 4 is a graph of the output versus input relationship of the relays 20 and 20' shown in FIGS. 1, 2 and 3; and, FIG. 5 is a chart showing an example of the reset action for a step change in the input signal.

Relay 20 produces a modulating pressure output proportional to changes in its input pressure. Its output response curve is shown in FIG. 4. The output from the relay 20 changes in a 2 to 1 relationship to changes in the input to relay 20. A 2 to 1 relationship has been chosen since the averaging circuit 17 halves any changes in the input pressure in line 15. Thus, the input in line 15 bears a net 1 to 1 input/output relationship with the output in line 22.

FIG. 5 illustrates how the system in FIG. 1 operates. The system is normally set up to have as its steady state values an 8 psi input in line 15, an 8 psi reset signal in line 24, an 8 psi signal in pilot signal line 19, and an 8 psi signal in output line 22. When the input pressure within line 15 changes from 8 psi to 6 psi as a result of a change in the temperature sensed by metallic flapper 13, averaging circuit 17 takes the average between the 6 psi signal in line 15 and the 8 psi signal in line 24 and produces an output in pilot signal line 19 of 7 psi which results in an output pressure of 6 psi in line 22 as shown in the graph of FIG. 4. The change in the reset signal in line 24 does not occur immediately upon the change in the output pressure in line 22 because of the capacity of the tank 26. However, after a delay determined by the size of the capacity tank 26, the pressure in line 24 will begin decreasing. When the pressure in line 24 is down to 6 psi, averaging circuit 12 averages the 6 psi signal in line 15 and the 6 psi signal in line 24 to produce a 6 psi pilot signal in line 19 which results in, as seen from FIG. 4, an output signal in line 22 of 4 psi. Thus, the feedback pressure in line 24 continues to decrease and will decrease to zero unless the pressure in line 15 changes as a result of a change in the temperature sensed by the bimetallic flapper 13. For example, the output 22 may be connected to a condition changing valve the position of which changes as a result of the changing output in line 22. The changing position of the valve connected to line 22 will, of course, change the condition sensed by bimetallic flapper 13. When the condition has been changed sufficiently to raise the pressure in line 15 to 8 psi, the output in line 22 will cease to change. For example, assume that when the output signal in line 22 has reached 2 psi, the condition has changed to the extent necessary to move the flapper 13 with respect to nozzle 12 to increase the pressure in line 15 back to 8 psi. At this point, the averaging circuit 17 will average the 8 psi signal with the 2 psi feedback signal to produce an output signal of 5 psi. From the chart in FIG. 4, an input of 5 psi to relay 20 produces an output of 2 psi and a steady state situation will result. However, in the example used in FIG. 5, the input pressure is not increased to 8 psi until the output pressure has been reduced to zero. At this point, with the input pressure in line 15 at 8 psi, the feedback signal is at zero so that the output from averaging circuit 17 is 4 psi which, from the chart of FIG. 4 produces an output of zero from relay 20. The steady state condition will be, therefore, an input signal at line 15 of 8 psi, a reset signal in line 24 of zero psi, a pilot signal of line 19 of 4 psi and an output signal in line 22 of zero psi.

Assume now that a condition changes to increase the pressure in line 15 to 10 psi. Because of the delay tank 26, the pressure in line 24 remains at zero for a time. However, the averaging circuit 17 averages the 10 psi signal in line 15 with the zero psi signal in line 24 to produce a 5 psi signal in line 19. The 5 psi input to relay 20 produces a 2 psi output signal which is fed back to the feedback circuit 24 and capacity tank 26. When the pressure within line 24 is 2 psi, the averaging circuit produces an output of 6 psi which results in an output from relay circuit 20 of 4 psi and so on until the input signal in line 15 is brought back to 8 psi.

Figure 2:
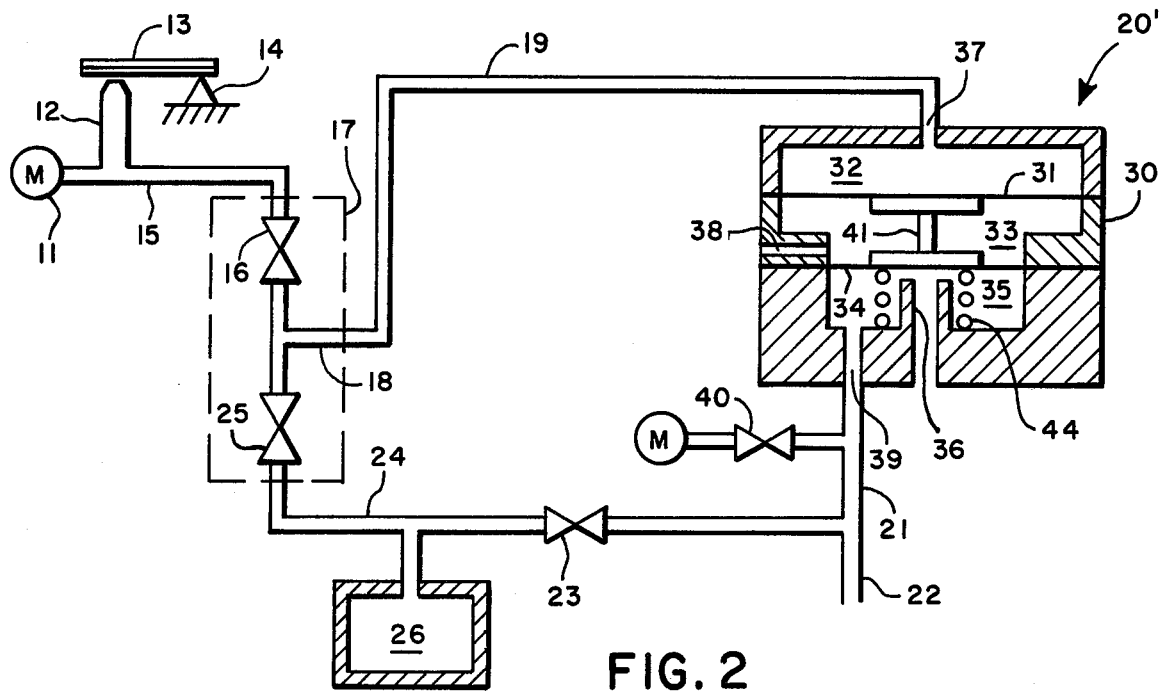
FIG. 2 shows a second form for providing reset action.

The circuit of FIG. 2 performs essentially the same as the FIG. 1 and the same reference numerals have been used to refer to elements which are the same as those of FIG. 1. Relay 20' in FIG. 2 comprises housing 30 having diaphragm 31 separating control chamber 32 from middle chamber 33 and diaphragm 34 separating middle chamber 33 from output chamber 35. Within output chamber 35 is nozzle 36 connected to atmosphere. Port 37 of housing 30 is connected to line 19 and middle chamber 33 is connected to atmosphere through vent 38. Port 39 is connected to line 21 and is also connected to a source of main pressure through restriction 40. Pusher plate 41 is attached to both diaphragms 31 and 34. As the pressure within control chamber 32 increases, diaphragms 31 and 34 and pusher plate 41 are moved down tending to decrease the amount of air allowed to escape to atmosphere through nozzle 36 thereby increasing the pressure within output line 22. Likewise a decrease in pressure within control chamber 32 allows diaphragms 31 and 34 and pusher plate 41 to move away from the nozzle 36 porting more air to atmosphere from control chamber 35 thereby decreasing the output in line 22. Spring 44 within output chamber 35 biases the diaphragms 31 and 34 and pusher plate assembly away from the nozzle 36. The spring 44 is selected to predetermine the intersection point between the response curve shown in FIG. 4 and the signal in axis. The difference in area of the diaphragms 31 and 34 determines the slope of the curve in FIG. 4. This arrangement operates in much the same way as the arrangement shown in FIG. 1 and the operation is not, therefore separately set out here.

Figure 3:
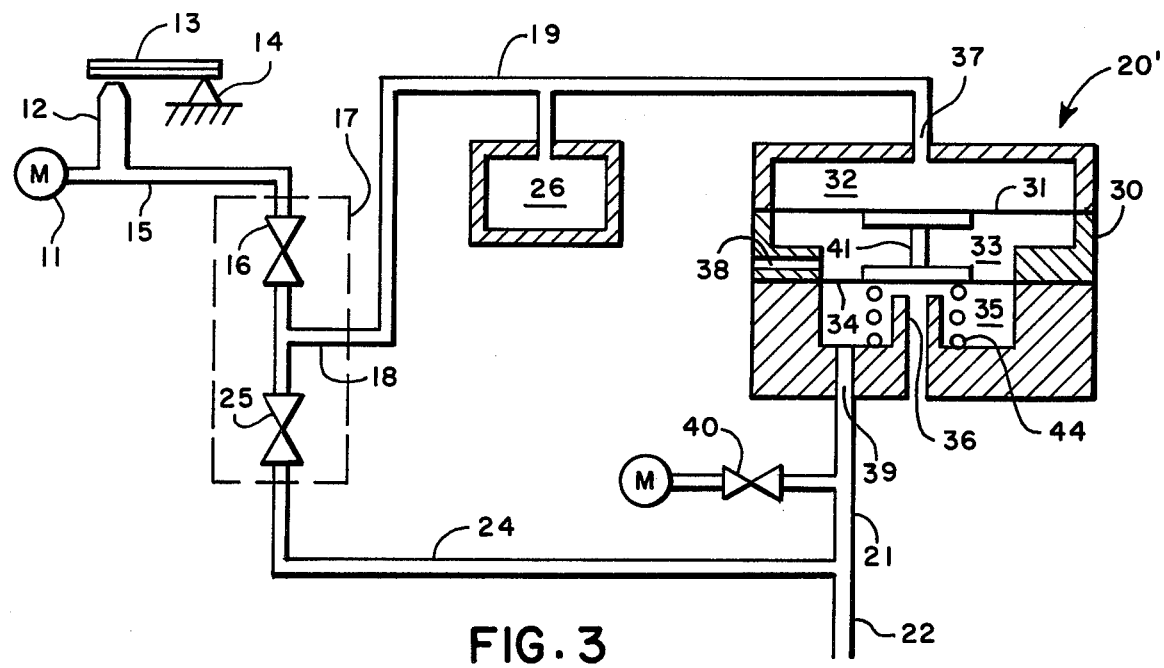
FIG. 3 shows a third form for providing reset action.

The circuits shown in FIGS. 1 and 2 delay only the feedback signal within line 24. The arrangement shown in FIG. 3 delays both the feedback signal within line 24 and the output signal within line 22. Delay or capacity tank 24 is connected to line 19 rather than to line 24. Although either the circuit of FIG. 1 or the circuit of FIG. 2 can take advantage of the connection of capacity 24 to the line 19, FIG. 3 shows the capacity 24 connected to line 19 with respect to the arrangement of FIG. 2. The reset action is the same but, in the case of FIG. 3, the output signal in line 22 is also delayed.

The embodiments of the invention in which an exclusive property or right is claimed are defined as follows:

1. A system for providing reset action comprising:
   pressure dividing means having a first input adapted to receive an input signal, a second input connected to receive a feedback signal and an output providing a pilot signal which is a division of said input signal and said feedback signal;
   output means having an input and an output;
   connecting means connecting said output of said pressure divider means to said input of said output means and connecting said output of said output means to said second input of said pressure divider means; and, capacity means connected to said connecting means for delaying a change in said feedback signal upon an occurrence of a change in said input signal, said output means producing an output signal having a predetermined relationship to said pilot signal.

2. The system of claim 1 wherein said connecting means comprises a first connector connecting said output of said pressure divider means to said input of said output means and a second connector connecting said output of said output means to said second input of said pressure divider means.

3. The system of claim 2 wherein said capacity means is connected to said first connector.

4. The system of claim 3 wherein said output means comprises a relay for changing said output signal in a manner to counterbalance a division of any changes in said input signal by said pressure divider means.

5. The system of claim 4 further comprising sensor means for producing said input signal in response to a condition.

6. The system of claim 2 wherein said capacity means is connected to said second connector.

7. The system of claim 6 wherein said output means comprises a relay for changing said output signal in a manner to counterbalance a division of any changes in said input signal by said pressure divider means.

8. The system of claim 7 further comprising sensor means for producing said input signal in response to a condition.

9. A system for providing reset action comprising:
averaging means having a first input for receiving an input signal, a second input connected to receive a feedback signal, and an output for providing a pilot signal which is an average of said input signal and said feedback signal;
output means having an input and an output;
first connecting means connecting said output of said averaging means to said input of said output means;
second connecting means connecting said output of said output means to said second input of said averaging means for supplying said feedback signal;
capacity means connected to said second connecting means for delaying a change in said feedback signal upon an occurrence of a change in said input signal;
said output means producing an output signal bearing a predetermined relationship to said pilot signal.

10. The system of claim 9 wherein said output means comprises a relay for changing said output signal in a 2 to 1 relationship with changes in said pilot signal.

11. The system of claim 10 further comprising sensor means for providing said input signal dependent upon a sensed condition.

12. The system of claim 11 wherein said sensor means comprises a thermostat.

13. The system of claim 9 wherein said averaging means comprises a first restriction connected between said first input and said output of said averaging means, and a second restriction connected between said second input and said output of said averaging means, wherein said first restriction and said second restriction are substantially equal.

14. The system of claim 10 wherein said output means comprises a relay for changing said output signal in a 2 to 1 relationship with changes in said pilot signal.

15. A system for providing reset action comprising:
averaging means having a first input for receiving an input signal, a second input connected to receive a feedback signal, and an output for providing a pilot signal which is an average of said input signal and said feedback signal;
output means having an input and an output;
first connecting means connecting said output of said averaging means to said input of said output means;
second connecting means connecting said output of said output means to said second input of said averaging means for supplying said feedback signal; and,
capacity means connected to said first connecting means for delaying a change in said feedback signal and in said output signal upon an occurrence of a change in said input signal;
said output means producing an output signal having a predetermined relationship to said pilot signal.

16. The system of claim 15 wherein said output means comprises a relay for changing said output signal in a 2 to 1 relationship with changes in said pilot signal.

17. The system of claim 16 further comprising sensor means for providing said input signal dependent upon a sensed condition.

18. The system of claim 17 wherein said sensor means comprises a thermostat.

19. The system of claim 15 wherein said averaging means comprises a first restriction connected between said first input and said output of said averaging means, and a second restriction connected between said second input and said output of said averaging means, wherein said first restriction and said second restriction are substantially equal.

20. The system of claim 19 wherein said output means comprises a relay for changing said output signal in a 2 to 1 relationship with changes in said pilot signal.

* * * * *